(12) United States Patent
Heilmann et al.

(10) Patent No.: US 9,140,780 B2
(45) Date of Patent: Sep. 22, 2015

(54) RADAR SENSOR HAVING A BLINDNESS DETECTION DEVICE

(75) Inventors: Stefan Heilmann, Vaihingen/Enz (DE); Sonja Eder, Koengen (DE); Wolf Steffens, Herrenberg (DE); Goetz Kuehnle, Hemmingen (DE); Dirk Bechler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 827 days.

(21) Appl. No.: 13/254,751

(22) PCT Filed: Jan. 8, 2010

(86) PCT No.: PCT/EP2010/050119
§ 371 (c)(1),
(2), (4) Date: Nov. 17, 2011

(87) PCT Pub. No.: WO2010/099988
PCT Pub. Date: Sep. 10, 2010

(65) Prior Publication Data
US 2012/0050093 A1    Mar. 1, 2012

(30) Foreign Application Priority Data

Mar. 2, 2009    (DE) .......................... 10 2009 001 265

(51) Int. Cl.
*G01S 13/38*    (2006.01)
*G01S 7/40*     (2006.01)
(Continued)

(52) U.S. Cl.
CPC ............. *G01S 7/4004* (2013.01); *G01S 7/4056* (2013.01); *G01S 13/343* (2013.01); *G01S 13/345* (2013.01); *G01S 13/931* (2013.01);
(Continued)

(58) Field of Classification Search
CPC ............... G01S 13/931; G01S 7/4004; G01S 2007/4039; G01S 2007/4082; G01S 2013/9321; G01S 13/343; G01S 13/345
USPC ..................................... 342/70, 165, 173, 186
See application file for complete search history.

(56) References Cited

U.S. PATENT DOCUMENTS 5,257,029 A * 10/1993 Miyo ............................ 342/352
5,345,470 A *  9/1994 Alexander ................... 375/144
5,517,196 A *  5/1996 Pakett et al. .................... 342/70
(Continued)

FOREIGN PATENT DOCUMENTS

DE    199 29 794    1/2000
DE    102 43 115    4/2003

OTHER PUBLICATIONS

International Search Report for PCT/EP2010/050119, dated Apr. 22, 2010.

Primary Examiner — John B Sotomayor
Assistant Examiner — Marcus Windrich
(74) Attorney, Agent, or Firm — Kenyon & Kenyon LLP

(57) ABSTRACT

A radar sensor having a corresponding evaluation and control device, which has a measuring mode for locating radar targets and a blindness detection device, which is configured to detect blinding of the radar sensor with the aid of the signals received by the radar sensor itself; wherein the evaluation and control device has a test mode, in which the radar sensor is controlled on the basis of parameters that are different from the parameters for the measuring mode and optimized for the blindness detection device, and the evaluation and control device has a switching device for switching over between the measuring mode and the testing mode.

3 Claims, 3 Drawing Sheets

(51) Int. Cl.
*G01S 13/34* (2006.01)
*G01S 13/93* (2006.01)

(52) U.S. Cl.
CPC .......................... *G01S 2007/4039* (2013.01);
*G01S 2007/4082* (2013.01); *G01S 2013/9321*
(2013.01)

(56) References Cited

U.S. PATENT DOCUMENTS

| | | | | |
|---|---|---|---|---|
| 5,563,602 | A * | 10/1996 | Stove | 342/70 |
| 5,841,393 | A * | 11/1998 | Saito et al. | 342/165 |
| 6,124,823 | A * | 9/2000 | Tokoro | 342/70 |
| 6,348,889 | B1 * | 2/2002 | Ashihara et al. | 342/70 |
| 6,469,656 | B1 * | 10/2002 | Wagner et al. | 342/70 |
| 6,469,659 | B1 * | 10/2002 | Lajiness et al. | 342/173 |
| 6,954,172 | B2 * | 10/2005 | Hofmann et al. | 342/173 |
| 7,737,882 | B2 * | 6/2010 | Matsuoka | 342/109 |
| 2003/0071753 | A1 * | 4/2003 | Vacanti | 342/173 |
| 2007/0040727 | A1 | 2/2007 | Matsuoka | |
| 2007/0182528 | A1 * | 8/2007 | Breed et al. | 340/435 |
| 2009/0243912 | A1 * | 10/2009 | Lohmeier et al. | 342/70 |

* cited by examiner

RADAR SENSOR HAVING A BLINDNESS DETECTION DEVICE

FIELD OF THE INVENTION

The present invention relates to a radar sensor having a corresponding evaluation and control device, which has a measuring mode for locating radar targets and includes a blindness detection device that is configured to detect blinding of the radar sensor with the aid of the signals received by the radar sensor itself.

BACKGROUND

Motor vehicles are increasingly being equipped with driver assistance systems, e.g., for automatically controlling proximity (ACC, adaptive cruise control) or for warning of imminent collisions and, optionally, for initiating measures for averting the collision or for mitigating the effects of the collision (PSS; predictive safety system). In these driver assistance systems, a radar sensor is used for monitoring the surrounding traffic and, in particular, for locating other vehicles. Since the driver generally relies on the operability of the assistance system, it is necessary, for reasons of safety, that functional impairment of the radar sensor during continuous operation be detected and be able to be signaled to the driver.

For this reason, radar sensors for motor vehicles are equipped with a blindness detection device, which evaluates the received radar signals in a special manner while the radar sensor is operated in the measuring mode, in order to thus generate one or more blindness indicators that indicate functional impairment of the radar sensor, all the way up to complete blinding.

An obvious criterion for blinding consists in that the radar sensor does not receive any radar echoes at all. However, this criterion alone is not very meaningful, since it cannot rule out that no radar targets are actually in the locating range of the sensor.

In general, though, a radar sensor installed in a vehicle always receives certain reflections of ground irregularities. These reflections are referred to as "ground clutter." The absence of this ground clutter is a relatively reliable indication of blinding.

Heavy rain that reflects and attenuates the radar beam and thereby reduces the sensitivity of the sensor may also be a possible cause of blinding of the radar sensor. For its part, though, the reflection of the radar beam results in a detectable signal, the so-called rain clutter. Thus, in principle, it is possible to detect heavy rain and the functional impairment of the radar sensor accompanying it by purposefully searching for this rain clutter.

Another possible cause of blinding is a layer of dirt or a film of water on the surface of the radar lens or of the radome. Such a layer results in reflection and attenuation of the radar signal and, therefore, in a loss of sensitivity. However, in this instance as well, in principle, the reflection caused by the layer of dirt constitutes, for its part, a detectable signal, with the aid of which the blinding could be detected. Generally, the distance between the layer of dirt and the radar antenna is so short, that it is normally outside of the distance range that may be monitored with the aid of the radar sensor.

Finally, a special form of blinding is the so-called angular blindness, which may be caused by a layer of ice on the radar lens or the radome. To be sure, such an ice layer does not result in significant reflection and attenuation of the radar beam but, due to refraction effects, causes a change in direction of the radar beam, which, in the case of radar sensors having angular resolution, may result in the angle data of the located objects no longer being reliable. The term "blindness detection" is to be understood in a comprehensive sense and shall also include such cases of angular blindness.

The object of the present invention is to provide a radar sensor, in particular for motor vehicles, which renders possible more reliable blindness detection.

SUMMARY

The object of the present invention is achieved in that the evaluation and control device has a test mode, in which the radar sensor is controlled on the basis of parameters that are different from the parameters for the measuring mode and optimized for the blindness detection device; and in that the evaluation and control device has a switching device for switching over between the measuring mode and the test mode.

The present invention is based on the consideration that the parameters, which determine the operating method of the radar sensor, are optimized with regard to the detection of objects such as vehicles driving ahead and the like and therefore do not automatically have to be optimal for the detection of different forms of blinding. Examples of these parameters are, for instance, the frequency and the power of the transmitted radar signal or, in the case of an FMCW radar (frequency modulated continuous wave) in which the transmitted frequency is modulated in a ramp-shaped manner, the modulation amplitude and the period of the modulation ramp. In accordance with the present invention, during the operation of the radar sensor, in the case of a driver assistance system, i.e., during the drive, the regular operating mode of the radar sensor, i.e., the measuring mode, is now interrupted from time to time, and instead, a switchover is made to a test mode in which the parameters are optimized with regard to the blindness detection, so that more reliable blindness detection becomes possible.

The interruptions of the measuring mode necessary for the test mode may be kept so brief and temporally selected in such a manner, that they do not affect the continuous monitoring of the surrounding traffic.

Advantageous refinements, which relate to, in particular, the monitoring of different blindness indicators and, in each instance, the corresponding parameter optimizations, are specified as described herein. In this context, it is understood that different test modes may also be provided for monitoring different blindness indicators.

An exemplary embodiment of the present invention is represented in the drawings and explained in greater detail in the following description.

DETAILED DESCRIPTION

Figure 1:
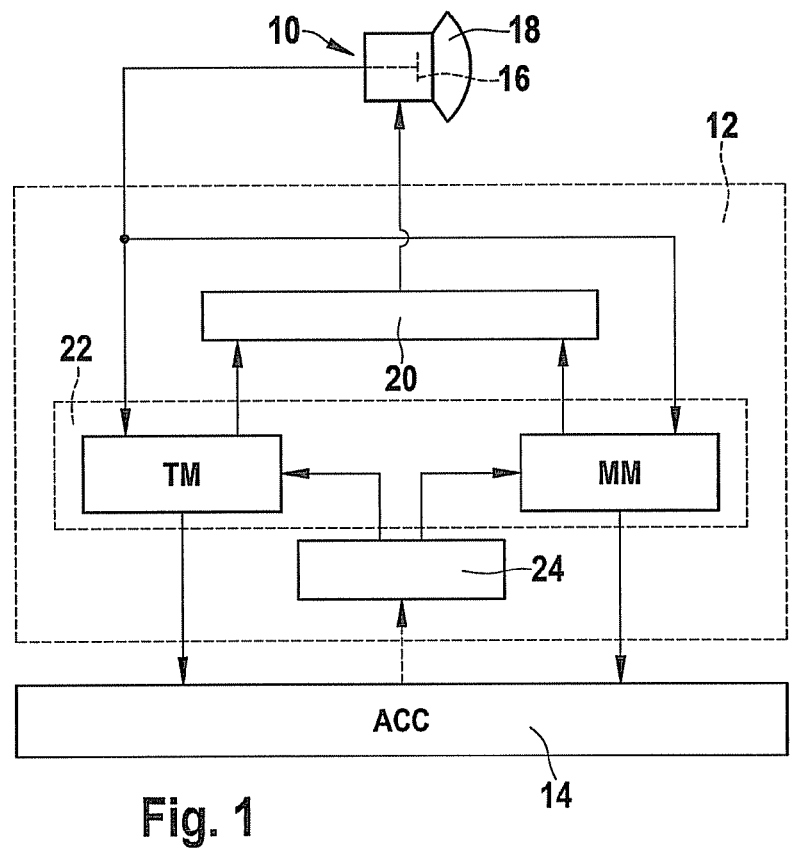
FIG. 1 shows a block diagram of a radar sensor according to the present invention.

The radar sensor shown in FIG. 1 has a transmitting and receiving module 10 and an associated evaluation and control device 12, which supplies information regarding the surrounding traffic to a driver assistance system 14, e.g., an adaptive cruise control (ACC) in a motor vehicle. Transmitting and receiving module 10 has at least one antenna 16, which is supplied, by evaluation and control device 12, with a signal to be transmitted and transfers the received signals to evaluation and control device 12 for evaluation. A so-called radome 18, i.e., a cover, which is intended to protect the antenna and the connected electronic components from effects of the weather, is situated in front of the antenna at a distance therefrom. In some cases, the function of the radome may also be fulfilled by a radar lens, which concentrates the transmitted and received radar beams.

Evaluation and control device 12 is formed by an electronic data processing system and includes a driver 20 for controlling transmitting and receiving module 10 and an evaluation part 22, which is operable in at least two different operating modes, namely, a measuring mode MM and at least one test mode TM. A switching device 24 controls the switching between the operating modes.

Measuring mode MM is used for locating radar targets. In the example shown, the radar sensor is an FMCW radar, in which frequency f of the radar signal transmitted by antenna 16 is modulated in a ramp-shaped manner, as shown schematically in FIG. 2. Here, frequency f is plotted versus time t. The echo received from a radar target (for example, a vehicle driving ahead) is mixed with the transmitted signal inside of transmitting and receiving module 10 with the aid of a mixer not shown, so that one obtains an intermediate frequency signal whose frequency corresponds to the frequency difference between the transmitted and received signal. This intermediate frequency signal is transmitted to evaluation part 22, and there, it is sampled, in each instance, over period T of a frequency ramp. The time signal sampled in this manner is then converted into a spectrum, using fast Fourier transformation (FFT). In this spectrum, each located object stands out in the form of a peak at a specific frequency.

Because of the ramp-shaped modulation of the transmitted signal, the frequency difference between the received and transmitted signal (and therefore, the frequency of the intermediate frequency signal) is a (in this case linear) function of the signal propagation time and, consequently, of the object distance. When the located object has a speed relative to the radar sensor of other than zero, the Doppler effect produces an additional shift in frequency. Consequently, the frequency of a peak in the spectrum is both a function of the distance and the relative speed of the object and implicitly defines a relationship between the possible distances and relative speeds of the object. By evaluating spectra, which were acquired on a plurality of modulation ramps having different slopes, it is then possible to uniquely assign each object a particular distance and a particular relative speed.

In practice, antenna 16 is mostly made up of a plurality of patches arranged side-by-side, and the azimuth angle of the located object may be determined by evaluating the amplitude and phase relationships between the signals received by the different patches. In measuring mode MM, the object location data acquired in this manner, i.e., the distance, the relative speed and the azimuth angle, are indicated to driver assistance system 14.

Figure 2:
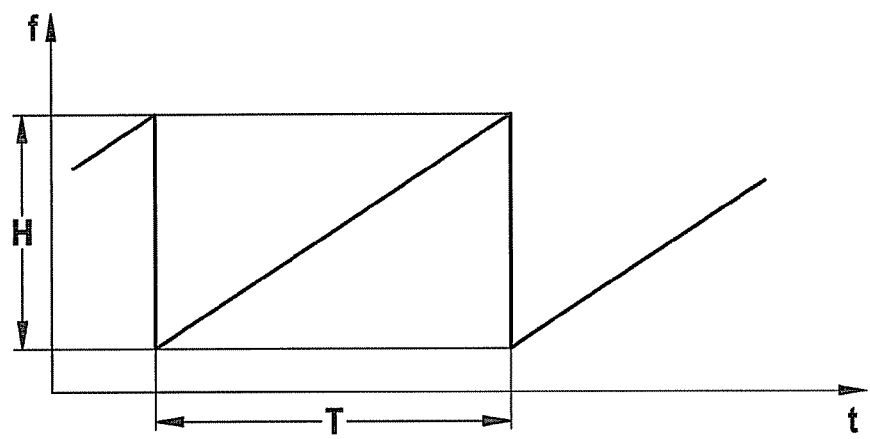
FIG. 2 shows a frequency/time graph for an FMCW radar.

As shown in FIG. 2, important parameters for the operation of the radar sensor include ramp period T and modulation amplitude H of the modulation ramp. In measuring mode MM, these parameters are optimized in such a manner, that an optimum resolution and sensitivity for objects in the relative distance range for traffic events are attained.

To be sure, using the parameter settings established for measuring mode MM, it is also possible, in principle, to evaluate the signals of the radar sensor in such a manner, that blinding or a reduction in the sensitivity of the radar sensor may be determined with the aid of different indicators, but in general, the choice of parameters for this blindness detection is not optimal. For this reason, in the case of the radar sensor described herein, a switchover is made from measuring mode MM to test mode TM from time to time, with the aid of switching device 24, and in this test mode, other parameters, namely, parameters that are optimized for blindness detection, are used for controlling transmitting and receiving module 10. Therefore, in the test mode, blindness detection is possible with increased reliability. When blinding or a significant degradation in the sensitivity of the radar sensor is detected, then this is signaled to driver assistance system 14, which responds to it in a suitable manner, e.g., by deactivating itself and outputting an appropriate warning sign to the driver.

Switching device 24 may be configured to periodically switch over between measuring mode MM and test mode TM. In this context, the duration of test mode TM may be, e.g, on the order of only a few milliseconds, which means that despite the occasional interruptions to the measuring mode, practically continuous monitoring of the surrounding traffic is still possible. In addition, in the example shown, driver assistance system 14 is capable of influencing the functioning of switching device 24, so that, e.g., in critical situations, for instance, when a collision is imminent, a switchover to the test mode may be prevented.

In the following, it will now be explained, with the aid of several examples, how the blindness detection may be improved by appropriate selection of the operating parameters in test mode TM.

If the radar sensor does not locate any vehicles driving ahead or other objects of comparable size, then this could indicate blinding of the radar sensor. However, it is also possible that simply no corresponding objects are present in the locating range of the radar sensor. At this stage, a possible test as to whether the radar sensor is blinded may be to temporarily increase the range of the radar sensor.

In practice, the range of object distances and relative speeds that may be monitored with the aid of the radar sensor is limited by the frequency range, in which the spectrum formed from the intermediate frequency signal may be evaluated. This range is largely determined by the hardware of evaluation part 22. The frequency of the object peaks in the spectrum increases proportionally to the object distance, which means that at or above a particular object distance, e.g., on the order of approximately 200 m, the objects are no longer in the evaluable range of the spectrum. However, by reducing frequency sweep H (FIG. 2) at the same ramp period, the frequency of an object peak may be made to increase more slowly with increasing object distance, which means that the radar sensor is then sensitive to objects at an even further distance. If no objects can be detected in this enlarged distance range, as well, then this is an indicator of blinding of the radar sensor.

Even if there are no preceding vehicles or other objects in the locating range of the radar sensor, a signal that is caused by reflections of the radar beams at the surface of the roadway is nevertheless present in a certain frequency range of the spectrum. Any small irregularity on the roadway causes a portion of the radar beam to be reflected again to the transmitting and receiving module. The corresponding signals are discernible in the spectrum as so-called "ground clutter." If this ground clutter can be detected in test mode TM, then this means that the sensor is not blinded.

However, the ground clutter only occurs in the spectrum in a certain frequency range, which is a function of, inter alia, the installation height of transmitting and receiving module 10 in the vehicle and the vertical beam angle of the radar beam. In the case of a large installation height, the radar beam first strikes the roadway at a greater distance, and correspondingly, the ground clutter will first occur at higher frequencies, but will then become weaker with further increasing distance due to the decrease in the signal intensity. Since the relative speed of the roadway surface matches reference speed V of the vehicle right down to the algebraic sign, the ground clutter is also subject to a corresponding Doppler shift.

A measure of the intensity of the ground clutter and, therefore, of the radar sensor sensitivity still available, may be obtained by integrating, in the spectrum, over the frequency range, in which ground clutter is to be expected, but in which no "real" objects normally appear. In this context, for reliable detection, it is advantageous when the ground clutter is distributed over a portion of the evaluable range of the spectrum that is as large as possible.

Figure 3:
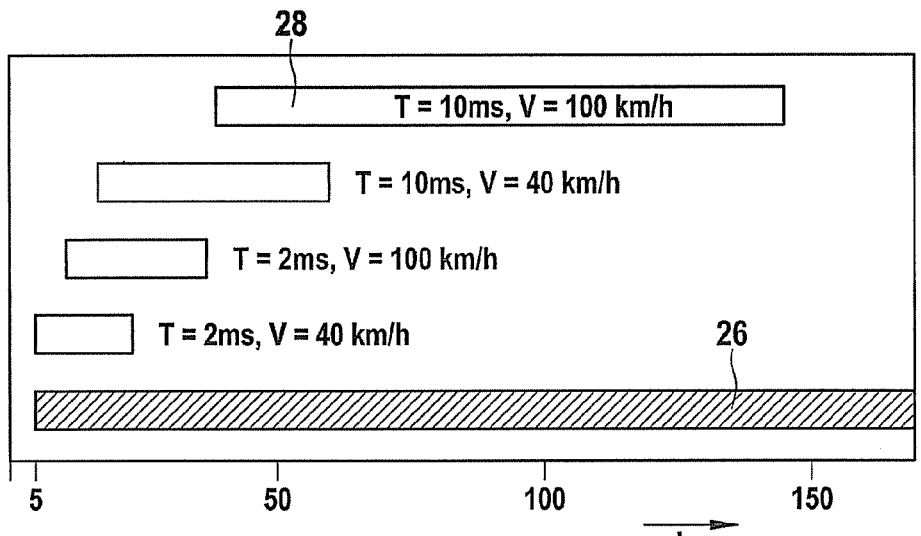
FIGS. 3 and 4 show diagrams for explaining the influence of changes in operating parameters of the radar sensor in a test mode for blindness detection.

FIG. 3 shows how, in the case of different reference speeds V of the vehicle, the position of the ground clutter in the spectrum may be influenced by changing ramp period T of the modulation ramp (at a constant frequency sweep). In FIG. 3, numbers k of the so-called frequency bins, into which the spectrum of the intermediate frequency signal is subdivided, are plotted on the horizontal axis. These numbers k correspond to the different frequencies in the spectrum, right down to a normalization constant, and extend, in practice, e.g., from 0 to 511. In FIG. 3, only the lower part of the spectrum is shown. In FIG. 3, evaluable range 26 of the spectrum is shown with hatching and first begins at bin no. 5. Ground clutter range 28, i.e., the frequency range in which ground clutter may be detected (and integrated), is shown for different combinations of ramp period T and reference speed V. If ramp period T is only 2 ms, then, at a speed V of 40 km/h, the ground clutter occurs only in a narrow frequency range at the lower end of evaluable range 26. Even an increase in speed V to 100 km/h results in only a slight expansion and shift of the ground clutter range. However, when ramp period T of the modulation ramp is increased to 10 ms, then ground clutter range 28 is markedly extended, in fact, all the more, the higher reference speed V is. Therefore, a relatively large ramp period T turns out to be advantageous for detecting ground clutter, and consequently, for checking that the radar sensor is not blind. The longer ramp period also has the advantage that integration over a larger frequency interval produces a more stable result for the ground clutter indicator. In addition, the sampling time in which the spectrum is recorded also increases with ramp period T, and this results, in a positive manner, in a reduction of the noise, which means that the ground clutter and other evaluable signals attain a more favorable signal-to-noise ratio. At this low reference speed, e.g., at V=0, the lengthening of ramp period T causes a significant portion of ground clutter range 28 to be inside of evaluable range 26 for the first time.

Another blindness indicator is based on the detection of the so-called rain clutter, which is caused by reflection of the radar signal at rain drops, but only in a distance range of approximately 0 to 10 m, since at greater distances, the weak radar echoes of the rain drops are no longer detectable.

If rain clutter is detected, then this means that the intensity of the radar beam is sharply diminished by the rain, and therefore, the range and sensitivity of the radar sensor are markedly reduced. Therefore, the detection of heavy rain is synonymous to the determination that the radar sensor is completely or partially blinded.

Figure 4:
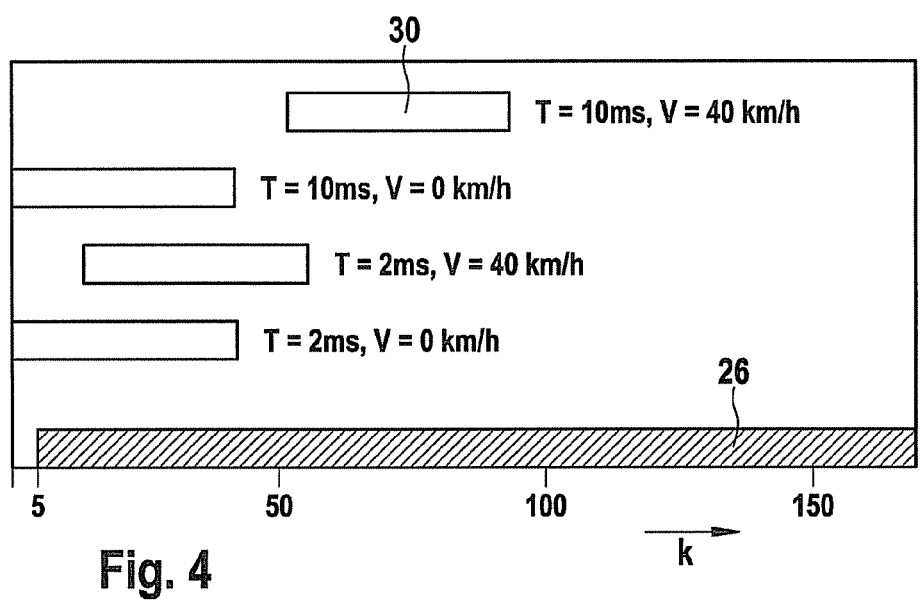

FIG. 4 shows how changing ramp period T at different speeds (V=0 and 40 km/h) affects rain clutter range 30, i.e., the frequency range in which rain clutter is detectable. It is apparent that with increasing ramp period T, rain clutter range 30 is shifted to higher frequencies, but is not extended. In this case, unlike in the case of ground clutter range 28, no extension occurs because the radar beams reflected at the rain drops travel chiefly parallelly to the direction of travel and are therefore always subject to the same Doppler shift irrespective of the distance of the drops, while in the case of ground clutter, the radar beams reflected by the ground travel more or less oblique to the ground, which means that in this instance, the component that is influenced by the Doppler shift is a function of the specific distance.

However, in the case of rain clutter, the lengthening of ramp period T also has the positive effect that, even at lower speeds, rain clutter range 30 is shifted completely into evaluable range 26.

Figure 5:
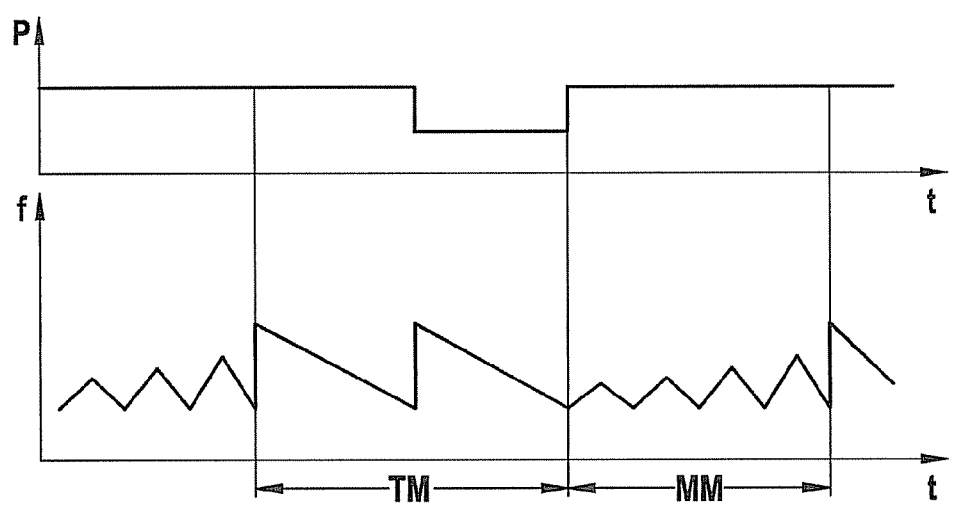
FIG. 5 shows a power/time graph and a frequency/time graph.

FIG. 5 shows an example of a possible modulation scheme in the case of alternating operation of the radar sensor in measuring mode MM and in test mode TM. In the lower part of the graph in FIG. 5, modulated frequency f of the transmitted signal is plotted versus time t. In the measuring mode, the modulation takes place in alternating fashion with rising and falling ramps, at a constant, relatively small ramp period. In the example shown, the modulation amplitude is continuously varied during the measuring mode, e.g., in order to adjust the range of the radar sensor to the specific traffic situation.

However, in testing mode TM, only falling frequency ramps are run, and indeed, with a markedly increased ramp period and also a (slightly) increased modulation amplitude. The use of falling ramps is advantageous for blindness detection, in particular, for the detection of rain clutter, since the portions of the frequency shift dependent on distance and relative speed then interact in such a manner, that the rain clutter range is shifted into the evaluable range.

In addition, modulation period T is kept constant in the test mode, which simplifies the evaluation of the received signals.

In the upper graph in FIG. 5, power P radiated by antenna 16 is plotted versus the time. One recognizes that in test mode TM, this power is varied between at least two values, and in the example shown, between a higher value on one modulation ramp and a lower value on another modulation ramp. This power variation allows states, in which the sensitivity of the radar sensor is reduced, to be detected in an even more responsive and reliable manner, for factors that reduce the sensitivity will have a particularly powerful effect at reduced power. Therefore, a comparison between the signals that, in the test mode, are received, on one hand, at high power and, on the other hand, at reduced power, allows the blindness indicators to stand out more clearly and also renders the blindness detection more robust with respect to temperature and ageing effects that affect the performance of the transmitting and receiving electronics.

If modulation amplitude H is markedly increased in the test mode, then cases of blinding that are attributable to a layer of dirt or film of water on radome 18 (FIG. 1) may also be detected. This is because such a layer causes a portion of the beam emitted by antenna 16 to be already reflected at radome 18. Therefore, this layer may be regarded as a "radar target" that is situated at an extremely short distance from antenna 16. However, using the normal evaluation method that is based on an analysis of the spectrum of the intermediate frequency signal, objects are not detectable at such short distances. In these cases, increasing modulation amplitude H brings the frequency of the intermediate frequency signal up closer to the evaluable range. Now, if one does not evaluate the spectrum, but directly evaluates the time signal from which the spectrum is obtained, then the beam reflected at radome 18 results in a sinusoidal signal having a characteristic frequency (that is very low in accordance with the short distance). If modulation amplitude H is sufficiently large, this frequency is increased so much that inside the relatively small time window (of the period of modulation ramp T), the sinusoidal signal is detectable as a sinusoidal signal having the characteristic frequency for the distance of the radome, which means that reflections at the radome layer may be directly detected.

What is claimed is:

1. A radar sensor, comprising:
an evaluation and control device, which has a measuring mode for locating radar targets and includes a blindness detection device configured to detect blinding of the radar sensor with the aid of the signals received by the radar sensor itself, wherein the evaluation and control device has a test mode, in which the radar sensor is controlled on the basis of parameters that are different from the parameters for the measuring mode and optimized for the blindness detection device, the evaluation and control device including a switching device for switching between the measuring mode and the test mode, wherein the evaluation and control device is configured to vary the transmission power between at least two levels during the test mode, and wherein the evaluation and control device is configured to modulate a frequency of the transmitted radar signal in a ramp-shaped manner in both the test mode and the measuring mode, and a ramp period in the test mode is changed with respect to the ramp period in the measuring mode, and an amplitude of the frequency modulation in the test mode is changed with respect to the amplitude of the frequency modulation in the measuring mode.

2. The radar sensor as recited in claim 1, wherein the evaluation and control device is configured to drive the radar sensor at a transmission power that is different in the test mode than in the measuring mode.

3. The radar sensor as recited in claim 1, wherein the evaluation and control device is configured to modulate a frequency of the transmitted radar signal in a ramp-shaped manner with, and wherein only falling frequency ramps are utilized in the test mode.

* * * * *